UNITED STATES PATENT OFFICE 2,395,446

CHEMICALS FOR TREATING PLANT LIFE

Watson L. Benson, Bridgeton, Ind.

No Drawing. Application October 22, 1942,
Serial No. 462,922

2 Claims. (Cl. 71—2)

This invention relates to chemical compositions for regulating or controlling the growth of plants.

The invention has reference to the compositions and methods of regulating or controlling both the higher and lower forms of plant life.

It also has reference to the use of certain compositions and methods embracing chemical substances when such substances are used in conjunction with other substances known as "agricultural chemicals" and commonly used to control or destroy the enemies of plant life.

This application is a continuation-in-part of my prior application Serial No. 407,686, filed November 20, 1941, entitled "Process of treating plant life with chemicals."

Prior to this invention it has been generally known that certain chemical compositions could be used to influence the processes of plant life. These are now variously referred to as "plant hormones," "plant vitamins," "growth substances," "hormone substances," "hormone-active chemicals," etc.

As examples of such previously known substances may be mentioned the indole, phenyl, naphthyl acetic, propionic, butyric and valeric acids and certain of their amides, esters and derivatives.

Some of the objects in the use of such substances in influencing plant processes are: More rapid and uniform germination; more rapid initiation and growth of roots; better bud, flower, and fruit development; inducing greater fruit or seed set by fortifying pollination and/or reducing blossom drop; reducing the acid content of fruit, principally through stimulating superior development and more uniform maturity; inducing stem elongation; reducing root shock and length of wilting period in transplants; inducing seedlessness (parthenocarpy); inhibiting or retarding bud, blossom or root development, or inhibiting other growth processes such as the too-early sprouting of potatoes or colchicum bulbs (called "maintaining dormancy"); promoting the healing of plant wounds; breaking the dormancy of tubers, bulbs or plants; inhibiting or retarding the growth of fungus; and preventing the preharvest drop of fruit by inhibiting abscission.

Methods commonly used in the application of such substances to plant life may be summarized as follows:

1. By dispersion of the chemical substances in diluents, vehicles, or carriers such as talc, cereal flour, walnut-shell flour, water, alcohol, lanolin, glycerine, petroleum oil, etc., and by application of the composition to seeds, tubers, bulbs, or roots. When applied to seed, the seed is usually coated with the dry powder, or if the composition is a liquid, by immersing the seed in the liquid for a period of a few minutes to as long as 36 hours. The convenient term for this is "seed treatment."

2. By dispersion in one or more such vehicles as illustrated in (1) above, and by application of the composition upon buds and blossoms of the plant.

3. By applying such a composition to stems and fruit of the plant.

4. By application to growing plants or seedlings, usually upon stems and foliage.

5. By application to the soil in which plants are growing or to be grown.

6. By mixing such compositions with other chemical materials, known as fertilizers or plant foods, and then by application of the mixture to the soil or otherwise making the mixture available to the plant.

Hereinafter, where the context permits, and for the purposes of brevity and convenience, one or more of the methods listed foregoing may be referred to as "plant treatment," "treatment of plants," "seed treatment," "blossom application," etc.

The present invention is based on the discovery of methods of making the above-listed applications more effective through the use of specific chemical substances alone, in conjunction with hormone substances, or with compositions not heretofore known to be capable of regulating or controlling plant growth in certain specific ways.

This invention relates specifically to the use in influencing the processes of plant life of levulinic acid (known also as levulic acid, laevulinic acid, beta-acetyl propionic acid, and gamma-keto valeric acid); of the calcium, sodium and other salts of levulinic acid; of the metal, mineral and ammonium compounds of levulinic acid—hereinafter referred to as "levulinic derivatives"; of mixtures of levulinic acid or levulinic derivatives with one or more substances selected from a group consisting of calcium sulphate, para amino benzoic acid, pantothenic acid, calcium pantothenate, niacin, thiamine hydrochloride, mono-calcium phosphate, or the valeric, butyric, acetic or propionic compounds of isoprene alcohol—all of which, while they may or may not have previously been known as plant hormones, have a definite relation to influencing the growth processes of plants, especially as they have been used in this invention.

This invention also relates to the use of levulinic acid or a levulinic derivative, for purposes of plant treatment, in a composition which includes one or more of the plant hormone substances, or of levulinic acid or a levulinic derivative in a composition which includes a plant hormone substance and one or more substances of a group consisting of calcium sulphate, para-amino benzoic acid, and pantothenic acid or its calcium salt—which may or may not be considered as plant hormones.

This invention also relates to the use of para-amino benzoic acid and/or pantothenic acid in plant treatment exclusive of inclusion in a composition with levulinic acid whether in admixture with other substances or not.

It is to be understood that reference to such compositions and mixtures as mentioned foregoing implies the use of the substances therein either at full strength or diluted for practicable application. It is also understood that reference to levulinic acid in any part of these specifications may also embrace the salts and derivatives of levulinic acid, whether specifically mentioned or not. In many instances the derivatives may be more effective or more economical in certain practical applications.

The present invention is also intended to embrace the use of levulinic acid as a solvent, mordant, activator, accelerator or acidifier as this relates to the use of other substances hereinbefore mentioned as having influence upon plant growth processes.

As a solvent the acid is of appreciable value to the practical user of hormone-active chemicals. In such use the acid is concurrently made available as an activator or accelerator of the process the treatment is intended to regulate or control. For one reason, some of the commonly used hormone substances, notably naphthylacetamide, do not readily or completely dissolve in the convenient solvents such as water, alcohol, acetone, etc.

Therefore an important phase of this invention is the discovery not only that levulinic acid is an excellent solvent for the hormones, but also that it accelerates their penetration and action. This is true even though wetting agents, ordinarily utilized for quicker penetration, are excluded in the composition used for treatment.

As an example, one of the more common applications of naphthylacetamide is in seed treatment, where concentrations of from 1 part in 500 to 1 part in 1000 are necessary for efficient results. Dissolving it in levulinic acid (20 parts levulinic to 1 part naphthylacetamide is a good solution) first permits the concentration of the amide in the eventual treatment composition to be as low as 20 parts in 1 million and still be as effective as compositions made up under prior knowledge. Moreover, this accelerated activity is not true, except in a very limited sense, with the few other solvents which are effective with naphthylacetamide.

As still another example, when either naphthylacetamide or naphthalene acetic acid is used for pre-harvest fruit spray, introducing levulinic acid into the composition, either as solvent or merely as added ingredient, will accelerate the penetrating action in excess of that given with presently used or prior known wetting agents utilized in such applications. I have also found that levulinic acid, similarly introduced, will make naphthylacetamide more effective as a fungicide.

(An illustration of a wetting agent, referred to foregoing, is a sulfonated alcohol of the fatty series.)

A secondary, but important advantage of levulinic acid for use as a plant treatment, or in conjunction with other substances as plant treatment compositions, is that it is compatible with so many substances, whether used as growth substances or not, and that it is completely soluble in water and any of the other convenient solvents such as alcohol, acetone, ether, etc.

Another important phase of this invention is the discovery that levulinic acid, or some of its derivatives, and mixtures of the acid or its derivatives, with a hormone-active naphthalene compound, or with para-amino benzoic acid and pantothenic acid, or in admixture with all three of these substances, when added in certain concentrations to bacterial (nitrogen-fixing bacteria) compositions used for inoculating the seeds of legumes at planting (commonly called "legume inoculants"), will substantially enhance the results therefrom. The desirability of including one or more of the three additional substances along with levulinic acid in such a composition depends upon the soil-type and condition; but I have found that to assure enhanced results in a majority of soils, it may be wise to add all four substances named above. The maximum safe limits of concentration appear to be: for the naphthyl acid or amide, 10 parts per million; para-amino benzoic acid, 10 parts; pantothenic acid, 3 parts; and levulinic acid (or certain derivatives), 50 parts.

As examples of legume inoculants may be cited those made up of a base or cultural and sustenance medium of agar, humus, or ground peat and charcoal mixture to which is added from 10,000,000 to 800,000,000 nitrogen-fixing bacteria of selected strains (dependent upon end-use) which have previously been laboratory-propagated. Only enough moisture to sustain the bacteria for a reasonable period should be incorporated in the composition when the growth substance mixture is to be a part of it. Preferably the growth-substance chemicals should be added to the base or cultural medium before the bacteria are introduced.

In applying said mixture to seeds, the seeds should not be wetted except where retention of the mixture is poor due to the smooth surface of the seed, and then only in the minimum quantity necessary to produce desired retention.

A phase of my invention relates to the discovery that when hormone-treatment compositions are based on levulinic acid, or contain this acid or one of its salts or derivatives, they may be more successfully combined with the commonly-used fungicides and insecticides which are applied to farm and garden crops to combat disease and insects; and that in addition, the two objects (influencing plant growth and combating plant enemies) may be accomplished in a single, cost-saving application, with frequently superior results than when separate applications are made.

(Examples of such fungicide and insecticide materials are Bordeaux mixture, rotenone, pyrethrum, cryolite, nicotine sulphate, Thanite, lime-sulphur, etc., usually for application to above-soil growth and mercurial, formaldehyde and copper (as well as some non-poisonous commercially sold compounds and mixtures) materials used to eradicate fungus from seed and soil—called "seed disinfectants").

One explanation of the discovery of superior results from such combinations is that levulinic substances are compatible with all the common insecticides or fungicides. Other growth substance materials may not be compatible. For instance, the naphthalene hormone acids and amides (used as principal ingredients) are greatly handicapped or their action is completely nullified by alkalinity. Many fungicide and/or insecticide materials and mixtures are highly alkaline. The action of levulinic acid is not so handicapped, and the inclusion of this acid in compositions embracing the naphthalene acids and amides, when used with said fungicide and insecticide materials, tends to offset the effect of alkalinity upon said hormones. Another possible explanation or reason for said superior results is that for successful mixture with fungicide and insecticide materials, the growth substance material or composition must be readily soluble in any convenient vehicle or diluent. The advantages of levulinic acid in this regard have been previously brought out in these specifications. The activating or accelerating advantages have also been hereinbefore brought out; and especially in respect to seed disinfectants, said advantages are marked, often enabling the user to accomplish desired results with a smaller quantity of disinfectant material when it is in mixture with the aforesaid growth substances. Other acids and substances will not substitute for levulinic acid in applications referred to immediately foregoing.

While levulinic acid itself, used in various concentrations from 1 part in 1,000,000 up to 25 parts in 100, indicates definite influence upon the growth processes of plants, and of certain processes in a greater number of plants, it will not, used alone as active ingredient in plant treatment compositions, regulate or control certain other processes in specific plants.

For instance, as an example, seed treatment with levulinic acid alone dispersed in talc or other inert diluent or vehicle will stimulate the top growth of oats, soybeans, peas, beets, cotton and some other common farm crop plants and garden flowering and ornamental plants; but similarly used in customary concentrations, it will not, as some investigators may believe, initiate roots on cuttings or bulbs nor greatly speed up and improve such rooting as will the commonly-used root hormone substances such as the indole and naphthyl acids and amides, except in instances too infrequent to justify claims of such, unless some other growth substance is present in the levulinic containing composition or otherwise comes concurrently in contact with the plant under treatment.

(Those exceptional instances where levulinic acid does seemingly initiate rooting when it is the sole active ingredient probably is due to the ideal acid condition created—or to the fact that the acid combines with or activates some other substance in the growing medium, and it, or the combination, is responsible for the root initiating apparency.)

Nor will levulinic acid alone initiate roots on cuttings (in sufficient consistency to justify affirmative conclusion) which ordinarily do not root at all in a commonly used rooting medium such as sand or sand and peat mixture; yet when an additional rooting substance is introduced, the mixture will induce the expected response, as will also some salts and derivatives of levulinic acid.

I have also discovered that the mixture of calcium sulphate and levulinic acid (hereinafter referred to, for brevity, as calcium sulfalinate) is particularly effective as an accelerator when used in rooting compositions and applications similar to the above-mentioned.

It has been shown, prior to this date, that the introduction of thiamine into a naphthalene or indole composition used for rooting cuttings or bulbs, will enhance the results. I have found that calcium sulfalinate included in such a composition will further enhance results.

It is to be understood that my discovery indicates that the influence of levulinic acid alone (as sole active ingredient in root treatment compositions) is not directly responsible for initiation of roots, but that it is particularly effective, as no other solvent-acid or activating-acid has been found to be, as an adjunct to other and more consistent root-initiating substances—said effectiveness resulting in speed and economy.

On the other hand, it is my discovery that levulinic acid is definitely a mild stimulant to root and top growth once roots are initiated; that while it is not as valuable, used alone as active ingredient, in propagating (by rooting) work as the commonly used root hormones previously mentioned, still it is quite valuable as a second active ingredient in compositions of this sort and even more valuable as such in seed treatment compositions. This has been borne out in repeated trials with a number of ornamental and crop plants. Among such crop plants may be mentioned beans, peas, tomatoes, sugar beets, sweet corn, field corn, oats, cotton, wheat, and a number of other crop plants under cultivation commercially or in home gardens. Marigolds may be cited as an example of a flowering plant in this connection.

The same exhaustive series of experiments also led to confirmation of the discovery that the acid is even more valuable when one or more additional growth substances are added to the treatment mixture; namely, para-amino benzoic acid, pantothenic acid, calcium sulfate, thiamine, and naphthyl acids, esters and amides; and certain other growth substances of minor importance.

That this is generally true is shown by the fact that the results among the various crops have been similar and consistent. That the results are not due merely or exclusively to the fact that an acid condition has been created or that levulinic acid may set free active auxins from the growth hormone already in the plant, is indicated by three evidences. First, other acids substituted for levulinic acid do not produce the same results or results approaching them in favorable degree. Second, levulinic acid has been found effective in activating substances when no natural hormones are present. Third, levulinic compounds, not acid in nature, will induce similar results.

Applications most clearly indicating some of the foregoing conclusions have been in seed treatment. By way of example, I cite my seed treatment trials with two common varieties of dwarf beans; namely, Bountiful and Stringless Wonder. The first row was planted to untreated seed; the second to seed treated with levulinic acid alone; the next to calcium sulfalinate-treated seeds; the next to seeds treated with a mixture of calcium sulfalinate, and naphthylacetamide; the next, with the admixture of calcium sulfalinate, naphthylacetamide, and para-amino benzoic acid; and the final row with this latter mixture but with additional admixture of thiamine, pantothenic acid, and niacin. This series was replicated five times for each variety. The substances were, of course, all included in a seed treatment composition and applied dry as above described.

The plants in the levulinic-treated row germinated somewhat more quickly, roots were very slightly greater (to the eye), and top growth was 15% taller in the early stages of growth than in the contiguous untreated rows. Weight of whole plants was about 17% greater. The same number of plants were taken from comparable locations in all rows for examination and weighing. But in the rows where naphthylacetamide had been added, roots were more numerous. Adding calcium sulfate also produced better root growth. Where para-amino benzoic acid was added, top growth was greater and healthier in any but the rows where all the named substances were used in the composition. The addition of the three vitamin substances (parts of B-complex) produced a slightly greater number of blossoms, and on the general average, roots were longer. The rows which had had the complete mixture application produced the greatest average yield.

During the second part of the same growing season, this experiment was repeated, except that in addition there were rows which had been planted to seeds treated with other combinations and individually with each of the named substances. Two replications were made of the individual treatments. Results in this repeated trial substantiated the prior findings, and also indicated that niacin and thiamine are the least beneficial in such applications; and that while thiamine is apparently more effective in root elongation than niacin, one may be substituted for the other (as I subsequently discovered in trials with many other plants) in most applications without affecting results in a practical way; but that without levulinic acid or a levulinic derivative in the treatment composition, the tendency toward longer roots is not as pronounced as when the levulinic material (acid or derivative) is included in a composition, for instance, embracing a hormone substance.

It possibly should be remarked that the discovery that thiamine and niacin could be substituted for one another is not necessarily a part of this invention, as no effort has been made to determine if such was a prior discovery; but that the fact that these two vitamin materials in combination with para-amino benzoic acid and/or pantothenic acid (or its salts), or in admixture with levulinic acid and/or one or more of the other materials mentioned are effective in certain plant treatment applications is a phase of the invention; and further that no other substitutions in the plant treatment formulas discovered in the course of these investigations, so far as they concern levulinic acid, calcium sulfate, para-amino benzoic acid, and pantothenic acid, can be made and still produce quite the effective response in certain applications that is produced in absence of substitution—is also a phase of the invention.

The following named substances were among those tried as substitutes for one or more of those I previously found effective; naphthalene acetic acid, indole butyric acid, indole acetic acid, isoprene butyrate, isoprene propionate, isoprene acetate, sodium naphthalene acetate, methyl indole propionate, indole propionic acid, naphthoxyacetic acid, methyl naphthalene acetate, thiourea, and monocalcium phosphate. The findings in this regard are omitted as to detail for sake of brevity, but as a general summary it may be pointed out that these substances, with the exception of the last two named which appear to be effective only as activators or as growth substances of minor activity, can be substituted for the root hormone (naphthylacetamide) in the complete mixture composition I found effective over a wide variety of crop plants, and then they may be effective to a lesser degree, but that they cannot be successfully substituted for one or more of the substances selected from a group consisting of levulinic acid, calcium sulfate, para-amino benzoic acid, and pantothenic acid without substantially affecting the treatment results on crop plants in an adverse way; and further that, since several of the named substitute materials are salts or esters, this effectively discounts the "acid theory" so far as any universal application of it in respect to crop plants (in particular) is concerned, in view of the fact that many of these hormone-active substances would substitute for the hormone substance of an acid nature but that they would not substitute for levulinic acid nor, as previously pointed out, could any other acid be substituted for levulinic acid.

As a substitution for the root hormone (naphthylacetamide) in the mixture composition begun with, the three isoprene compounds, particularly the butyrate, gave best results.

Since most previous findings in respect to mixtures of growth substance materials have been in connection with ornamental or the flower-garden type of plants, and not crop plants; and since these prior findings have been mainly with mixtures of two known hormones, to which, on occasion, one or more vitamins have been added, I believe my discoveries in this connection are a contribution to the art. Additional trials of the nature described, on a variety of plants in different soils, brought out that niacin and/or thiamine in mixtures with levulinic acid, are of value in the mixture, and respond to levulinic activation, under certain soil and climatic conditions. For example, I found incorporation of the two vitamin substances to be particularly desirable with sugar beets when grown in certain sandy, silt-loam types of soils.

An important discovery in respect to para-amino benzoic acid in similar connection, is that as a seed treatment it speeds germination in most instances; and that a mixture of a levulinic material and para-amino benzoic acid will further accelerate germination as much as thirty-six hours in some instances. That this is not due to an acid condition alone is proved by results from tests using levulinic compounds and various compositions containing para-amino benzoic acid for which the pH was above 7 (on alkaline side of neutral). In a number of instances, also, compositions with para-amino benzoic acid as the sole active ingredient substantially increased yield. These findings will be valuable in certain crop-plant usage where rapid germination as well as increased yield is desirable, and where the known hormone substances and other mixtures have been found to interfere with germination and sometimes retard top growth.

An incidental discovery of some importance is that levulinic acid is particularly helpful in making up seed treatment and bud-treatment compositions, in ways not hitherto brought out in these specifications. I have found that in order to induce the best cumulative response, compositions, embracing the known hormone-active substances and certain other growth substances, should be so constructed for "relative availability," that is each of the materials is immediately available to absorption by the plant to a certain degree, and slowly or gradually available to a certain degree or in a certain quantity, dependent upon the ratios of such availability as worked out for each component of the compound in respect to the particular plant or plants to be treated. For example, with sugar beets, the hormone should be only about 40% immediately available, the remaining 60% in such state that it becomes gradually available over a period of three or four weeks during the early growth of the plant; the para-amino benzoic acid should be only about 20% immediately available; calcium sulfate, 100% immediately available; pantothenic acid, thiamine and (if used) other vitamins, about 90% immediately available.

Naturally the ability to do this depends upon knowledge of the proper concentrations needed for inducing highest response in the particular plant (omitted in these specifications for sake of brevity); and upon having access to a solvent which will facilitate such construction of a composition having the desired relative availability. One explanation of the superiority of levulinic acid in such regard is that, unlike other suitable solvents convenient to the composition maker, it is not highly volatile. In seed treatment and one or two other applications, volatility of the solvent is not desirable if the proper balance among components as to relative availability, and correct dispersion, is to be maintained. These particular discoveries will be of service to those directly or indirectly engaged in practical agriculture.

As previously pointed out, a few of the other plant hormones may be substituted for naphthylacetamide in a multiple-substance mixture for seed treatment of certain plant varieties, yet the affinity of levulinic acid for naphthylacetamide and one or two of the other naphthyl compounds seem to be greater than for other hormones, with the exception of the isoprene compounds which I have found to cause reactions similar to those caused by the known root hormones, and may therefore be hormone-active substances.

Where a seed treatment composition is to be combined with a bacterial inoculant, I have found naphthylacetamide preferable as the root hormone in the admixture due to its resistance to deterioration and seemingly superior compatibility with the bacterial composition. Further, bacterial inoculants are frequently, in the hands of the layman, used in excessive dosage; and in such instances it may be preferable to have naphthylacetamide as the root hormone substance in a bacterial composition embracing also levulinic acid, calcium sulfate, para-amino benzoic acid and/or pantothenic acid because it is less likely to injure plants or seeds than some of the other known hormone-active chemicals.

Hereinafter, to avoid word-series repetition, the term "my complete seed-treatment mixture" will be used to refer to a composition which includes levulinic acid or a levulinic derivative; a hormone acid, ester or salt; calcium sulfate; para-amino benzoic acid; pantothenic acid; and thiamine carried in an inert diluent, dry or liquid.

Additional discoveries in the investigations referred to foregoing may be summarized, in part, as follows:

That one or more of the isoprene acids, salts and esters may be substituted for the hormone substance in my complete seed treatment mixture, and also may be expediently used in other mixtures which contain levulinic acid for the treatment of certain plants.

That there is no apparent substitute for the particular control or stimulation afforded by para-amino benzoic acid and panothenic acid (or its calcium salt) in the treatment of certain plants when the composition also contains levulinic acid, or as balancing ingredients for a composition designed to be effective in seed treatment over a wide variety of crop plants. That also in a composition of the latter type, these two substances are most desirable when used together therein.

That in the practical application of growth regulating compositions there can be no known exchangeable ingredients which are universally applicable, and that the prior knowledge that some growth substances were interchangeable cannot preclude discoveries made in the course of these investigations.

That the practical compositions for treatment as generally referred to above consist of 1,000,000 parts, of which levulinic acid may be 10 to 1000 parts; the hormone substance, 5 to 200 parts; calcium sulfate, 50 to 2000 parts; para-amino benzoic acid 10 to 200 parts; pantothenic acid or its calcium salt, 1 to 200 parts; and the vehicle of talc, flour, or other inert substance (q. s.), approximately 998,000 parts. Thiamine or niacin are introduced in 5 to 500 parts. In treating potatoes or other seeds with liquid solutions, lower concentrations are expedient; and usually the longer the soaking period, the lower the concentration may be.

That some of the attributes of levulinic acid, so used, are that it is effective over a wide range of concentrations, and that it may be used in higher concentrations than most other such substances without injury when the need dictates or demands; and that when levulinic acid is used in high concentration, it is often possible to reduce the concentration of other active substances in the composition without reducing effectiveness—resulting in both economy and avoidance of accidental injury when compositions are employed by inexperienced persons.

It should be emphasized here for clarity that the gist of my discoveries in seed treatment with levulinic compounds is that with such compounds it is possible to formulate a single treatment composition that will give satisfactorily good (from a practical standpoint) results over a wide variety of farm and garden crop plants, also that it is both possible and comparatively simple to make up special treatments which will induce highest response in one or more specific crop plants; and that in each case the ingredients will be somewhat different and not replaceable by other chemical substances if highest response is desired. This is something which could not be accomplished with ordinary horicultural skill and prior-known growth substances before these discoveries.

When a levulinic acid solution is sprayed on potato foliage before and during the blooming period, plants continue growth longer and larger potatoes are the yield. Spraying tomato plants one or more times from seedling stage to blooming will enhance foliage growth, and in some varieties (Bonny best, for instance), the amount of blooming is often increased. Spraying the blossoms of the tomatoes increase the set;

frequently enhances size and quality and produces a sweeter fruit. Spraying bean vines periodically, beginning just before blooming, will extend the normal growth period, lengthen the stems (vines), result often in more profuse blooming, and will induce more blossoms to set into pods.

When para-amino benzoic acid and/or naphthalene acetic acid and/or pantothenic acid are added, results in above-mentioned foliage applications are enhanced. Naphthylacetamide, or naphthyl esters or salts may be substituted sometimes for the acetic acid in such regard. In no case is the practical result as good without levulinic acid in the treatment composition. Frequently the response in certain ways may be as great when the naphthyl compound is used in very high (greater than .2%) concentrations; but this is not practical as epinasty (leaf curling or stem distortion) is increased and other injuries to plants may occur.

(In making up such solutions, water is the most common vehicle and levulinic acid may be used in ratio of 1 part to 400 or lower; the naphthalene compounds, 1 part to 200,000; para-amino benzoic acid, 1 part in 100,000 or 200,000; pantothenic acid, from as dilute as 1 part per million up to 1 part in 50,000. The amounts of the essential ingredients are varied by expediency, depending to some extent upon the pH of vehicle, plant species and variety, time of use, and the principal effect desired. Application may also be by dusting instead of spraying, using talc or some other suitable dry carrier as the diluent.)

(A wetting agent may be used to facilitate penetration, spreading and retention. Although the physiology of the plant determines the concentration, as a general example, a sulfonated alcohol may be used in ratio of as little as 20 c. c. to each 100 gallons of spray solution. The levulinic acid aids penetration with smaller quantities of wetting agent.)

The customary or standard concentration, when hormone substances are used to reduce the pre-harvest drop of fruit, is 10 parts of the hormone to a million parts water. When levulinic acid or certain levulinic compounds are incorporated in the composition, in 150 to 1000 parts, it is often possible to reduce the concentration of the hormone to 5 parts per million and still have it as effective as at the aforesaid standard concentration for any particular application previously requiring 10 parts per million; or, should the concentration of the hormone be left at 10 parts per million when levulinic acid is introduced into the composition, penetration is frequently speeded up and the effect upon fruit drop may be noticeable 3 to 5 hours sooner than usual. In addition, I have discovered that when levulinic acid is so used, it is also possible to reduce the drop of certain fruit varieties not so affected with prior-known and used compositions.

It should be mentioned that while levulinic acid (and in some cases its derivatives) has been shown to be effective over a wide range of concentrations and as high as 1000 or 1500 parts per million, this is not to be taken as indication that it can always, in all applications, be used in such strength. In fact, when the acid is used for applications upon the above-ground part of a plant, except in parthenocarpy work, although it may not injure some plants in the higher concentrations, it is best to use concentrations below 60 parts in 1000 because a few species and varieties of plants are injured at the higher concentration—even though it is possible to accomplish the immediate object with the higher concentration. For example, in blossom spraying where levulinic acid is used at 10,000 parts per million in conjunction with other substances, the immediate object of inducing seed set may be accomplished, yet where the spray falls upon the leaves and stems of certain plants, the eventual injury by this causation may so handicap the plant that complete seed development will be inhibited.

An example of my discovery in respect to parthenocarpy is that levulinic acid, used with either of the hormones, indolebutyric acid or naphthylacetamide, the percentage of set is slightly better, and there is less tendency toward epinasty, blossom-end rot and distorted shape fruit when lower concentrations of the hormone are thus made possible. For this a composition may be made up of 5 parts levulinic acid, 1.5 to 2.5 parts hormone (dependent upon form of carrier), and 1000 parts hydrous lanolin; with application, preferably in paste form, to emasculated blossoms. Sprays of lanolin or glycerine emulsion, or water, vehicles may be used—in which case it is preferable to use the lower concentrations. Levulinic acid will also accelerate the pollinating activities of naphthoxyacetic acid when used in parthenocarpy, but this mixture is often undesirable because of extreme epinasty resulting.

By way of example in inhibiting the sprouting of tubers or bulbs: I have discovered that a spray of levulinic acid, used 2 parts to 100 parts of lanolin emulsion, water, or glycerine, will retard sprouting up to ten days past normal, when the tubers or bulbs (colchicum, for example) are kept in a container that prevents rapid air change and excessive moisture infiltration. Such delay can be extended often to approximately two months if methyl naphthalene acetate or naphthylacetamide is made a part of the composition; i. e., in ratio of 1 part in 100, as one alternative, and in such case, the concentration of the levulinic acid may be lower. Spray may be applied either to the bulb or to the inside of the container.

An example in respect to application of levulinic acid through the soil; resulting in stem elongation, for one thing: The concentration should be approximately 8 parts levulinic (acid or salt) to 100 parts water for good results. This solution is applied to soil around the growing plant. If para-amino benzoic acid and pantothenic acid are also included in such mixture, the rate of elongation and tendency toward profuse foliage and blooming are increased. There should also be less tendency toward blossom drop in unfavorable weather. This method may be varied by adding said substances in similar concentrations to fertilizer (plant food) which is applied in this or other customary ways—in which case these named growth substances may also activate and speed the effect of the fertilizer materials.

Since it is my discovery that mixtures of levulinic acid or its compounds and nutrients (fertilizer), or levulinic compounds in admixture with para-amino benzoic acid, pantothenic acid and such nutrients, will produce beneficial and desirable results in growth of plants under commercial cultivation, it is to be understood that this is to be considered a phase of my invention.

While by statement and implication many of the advantages and benefits through this invention have been pointed out, to indicate the importance of this invention to the practice of agriculture, it would be well to summarize a few of them as follows:

1. My discovery will bring into availability a low-cost hormone treatment for farm crops, broadening the possibilities of practical and practicable use.

2. It (this invention) makes available a treatment which can be safely used in fairly high concentrations when need dictates.

3. It makes possible a single seed treatment mixture that will give quite profitable results on a large number of different crop plants and varieties and thereby make it possible for a diversified farmer to purchase but a single treatment composition for all his crops (in the event he will be satisfied with something a bit less than highest response in respect to, say, one or two crops). At the same time it makes possible the production of highly specialized treatments for specific crops, thereby making available to seed producers and specialized farmers or gardeners a seed treatment or spray which will give the highest reasonable return on that specific crop.

4. It greatly broadens the practicable use of an already-known and rather widely used hormone substance, naphthylacetamide, and of a few similar substances not so widely known or used, through the efficiency of levulinic acid as solvent and activator for the chemicals in question.

5. It makes possible appreciable savings to fruit growers, seed producers, and other users of hormone sprays through facilitating the use of more dilute solutions—which means doubling the amount of work done with the same cost for material.

6. It broadens the use-possibilities of bacterial inoculants, since it makes possible better results in legume growth and avoids the necessity for two separate applications by the user in order to achieve those results.

7. It makes possible simultaneous application of hormone treatments and seed disinfectants, with superior results at lower cost.

8. It makes possible not only appreciable savings to users of sprays and dusts for blossom and fruit application, but also broadens the commercial use of growth substance materials of this general kind, somewhat prohibitive, prior to this date, due to cost and necessity of separate applications—this advantage being due principally to the compatibility of my spray and dust compositions with any insecticide or fungicide; and the savings come through the fewer separate applications and the choice of using less of the active ingredients to achieve desired results.

9. It makes possible broader general use of growth substances for a number and variety of practical applications because of the easy solubility, safety, and compatibility attributes of levulinic acid and its compounds.

10. It makes possible a saving in time, and required propagation space, to those using hormone substances for rooting cuttings, etc.

11. It facilitates preparation of seed treatment and bud-treatment compositions of highest practicable activity, both from the "relative availability" and "non-volatility" standpoints.

In the appended claims, the use of the term "plants" is intended to include plants, roots, seeds, bulbs, tubers, seedlings, stems, leaves, stem cuttings, leaf cuttings, scions, slips, buds, flowers, and fruit, unless the reference is specific. The use of the term "growth regulating composition" is intended to include or refer to compounds in full or diluted strength, mixtures of compounds, admixtures of both compounds and chemical mixtures, mixtures or admixtures of compounds and/or mixtures with vehicles or diluents, and/or similar mixtures with natural organic substances, metals, or minerals for use in one or more of the methods known to the art, wherever the context permits. The term "derivative" is intended to cover any salt, ester, amide, alkyl or other substance derived from the acid mentioned.

The term "legume inoculant" refers to suitable nitrogen-fixing bacteria in any of the customary cultural and maintenance media such as have been hereinbefore explained.

The term "hormone compound" is intended to include any of the commonly known substances previously identified or customarily known as having hormone activity, such as the indole, phenyl and naphthyl acids and their amides, salts, esters and derivatives except where a specific reference is made.

The term "seed disinfectant" is intended to include the commonly known compositions, containing fungicides, customarily used for the purpose of ridding seed and/or the surrounding soil of fungi.

The term "levulinic acid material" is intended to include levulinic acid and/or any one of its derivatives and this specifically refers to the calcium, potassium, and sodium compounds of levulinic acid, and to some of the methyl and ethyl esters thereof. The most commonly used derivative is calcium levulinate. Nothing in the claims, unless specifically mentioned therein, is intended to suggest that levulinic acid is employed or may be employed as a substance for initiating or promoting the rooting of cuttings.

The term "plant growth initiating unit" is intended to cover that part of the plant, such as the seeds, tubers, bulbs and roots (when planting is by means of seeds, tubers, bulbs, roots, etc.), in which germination originates. For example, the use of the term is intended to cover roots only in the sense of the instances when roots are planted, as with certain grasses; and the term does not refer to propagation by the rooting of cuttings from other plants.

The term "suitable vehicle" is intended to suggest all the customarily used substances such as water, oils, fats, talc, soya flour, ground peat, etc., and while most such suitable vehicles or carriers or diluents are inert, it is not absolutely necessary in many instances that these vehicles be completely inert. In the following claims where "suitable vehicle" is not specifically mentioned, it is inferred that the use of the compositions and methods with or without a suitable vehicle is covered. It is understood that seldom is it feasible to use a plant regulating composition without a vehicle or carrier of some kind, and therefore, in the claims the use of a vehicle may be implied if not specifically stated.

The term "fertilizer" is intended to cover both organic and chemical types of fertilizers, and all other forms of plant stimulants commonly sold as "plant foods" or "fertilizers."

By employment of the isoprene compounds—butyrate, acetate, propionate and valerate—so far as my application is concerned, and mention thereof appears in the claims following, it is intended that the compositions and uses mentioned cover the generally accepted applications of plant growth regulators—for treating seed, influencing rooting processes, controlling bud, fruit, flower, seed and leaf formation and abscission, and similarly influencing various growth processes. It is not intended that the claims cover such broad general employment of the compounds as their use in ordinary paints and lacquers which might be applied to plants, such as trees, for other reasons.

By "plant hormone acid" in the claims, the term includes the following acids: indole butyric, indole acetic, indole propionic, indole valeric, naphthalene acetic, naphthalene butyric, phenyl acetic, naphthoxyacetic and isobutyric.

The terms "subjecting the plant" and "subjecting any part of the plant" are intended to include the seed of such plant as well as when such seed is so treated.

The term "pantothenic acid material" in the claims is intended to include pantothenic acid, and the calcium, sodium, potassium and levulose derivatives of said acid.

In conclusion, it is to be understood that no legal nor universal method exists for determining whether or not a chemical substance is a plant hormone, even though there are one or more methods in fairly common use for such identification or classification; it being possible at the present time merely to record that a substance performs functions or causes reactions that indicate "hormone activity." Therefore it is not intended to identify as hormones those substances mentioned in the appended claims which have not been theoretically identified as such prior to this date, but only to indicate that I have discovered them to have certain growth-influencing qualities which in some instances may be those of a hormone and in others, those of a vitamin.

Further, it is to be understood that although this invention has been described and explained in very considerable detail, with much specific terminology and language, the present disclosure is essentially illustrative and not restrictive, and that changes and modifications may be resorted to without departing from the spirit or scope of the invention as defined in the appended claims.

I claim:

1. A composition comprising a plant hormone material and at least one of the levulinic acid materials from the group consisting of levulinic acid, and sodium, calcium and ammonium salts of levulinic acid.

2. A composition as defined by claim 1 wherein there is included at least one of the vitamine materials from the group consisting of thiamin, niacin, para-amino-benzoic acid, pantothenic acid and calcium pantothenate.

WATSON L. BENSON.